(12) United States Patent
Wehmeyer

(10) Patent No.: US 8,763,046 B2
(45) Date of Patent: Jun. 24, 2014

(54) DBS FEATURE EXTENSION ARCHITECTURE

(75) Inventor: Keith Reynolds Wehmeyer, Fishers, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 407 days.

(21) Appl. No.: 12/291,531

(22) Filed: Nov. 10, 2008

(65) Prior Publication Data

US 2009/0133072 A1    May 21, 2009

Related U.S. Application Data

(62) Division of application No. 09/981,000, filed on Dec. 3, 2001, now abandoned.

(51) Int. Cl.
*G06F 3/00* (2006.01)
*G06F 13/00* (2006.01)
*H04N 5/445* (2011.01)

(52) U.S. Cl.
USPC .................. 725/49; 725/40; 725/41; 725/42; 725/43; 725/44; 725/45; 725/46; 725/47; 725/48; 725/50; 725/59; 725/109; 725/110; 725/136

(58) Field of Classification Search
USPC .......... 725/40–52, 59, 109–110, 136
See application file for complete search history.

(56) References Cited

U.S. PATENT DOCUMENTS

| | | | |
|---|---|---|---|
| 5,550,576 A | 8/1996 | Klosterman | |
| 5,579,308 A | 11/1996 | Humpleman | |
| 5,625,406 A | 4/1997 | Newberry et al. | |
| 5,801,787 A * | 9/1998 | Schein et al. | 725/43 |
| 5,808,694 A | 9/1998 | Usui et al. | |
| 5,844,552 A | 12/1998 | Gaughan et al. | |
| 5,883,677 A | 3/1999 | Hofmann | |
| 5,941,968 A | 8/1999 | Mergard et al. | |
| 6,005,562 A * | 12/1999 | Shiga et al. | 715/721 |
| 6,018,764 A * | 1/2000 | Field et al. | 709/217 |
| 6,020,880 A | 2/2000 | Naimpally | |
| 6,058,430 A * | 5/2000 | Kaplan | 709/245 |
| 6,133,910 A | 10/2000 | Stinebruner | |

(Continued)

FOREIGN PATENT DOCUMENTS

| | | |
|---|---|---|
| CN | 1218600 | 6/1999 |
| EP | 0852361 | 7/1998 |

(Continued)

OTHER PUBLICATIONS

Search Report Dated Feb. 21, 2000.

(Continued)

*Primary Examiner* — Jason Salce
(74) *Attorney, Agent, or Firm* — Robert D. Shedd; Reitseng Lin

(57) ABSTRACT

An enhanced electronic program guide (EPG) capable of displaying DBS program information and NTSC program information seamlessly and in real-time on a display device is accomplished, in one form, by a wide-band data link between a DBS receiver adapted to receive a DBS broadcast data stream and an internet set-top unit, the internet set-top unit adapted to receive NTSC audio/video signals and internet data/information. In another form, the DBS receiver is controlled by the internet set-top box. Supplemental information transmittable on the DBS data stream may also be displayed on the display device.

16 Claims, 2 Drawing Sheets

(56) References Cited

U.S. PATENT DOCUMENTS

| | | | |
|---|---|---|---|
| 6,169,879 B1 * | 1/2001 | Perlman | 725/119 |
| 6,182,094 B1 | 1/2001 | Humpleman et al. | |
| 6,182,287 B1 | 1/2001 | Schneidewend et al. | |
| 6,219,839 B1 * | 4/2001 | Sampsell | 725/40 |
| 6,259,891 B1 | 7/2001 | Allen | |
| 6,268,849 B1 * | 7/2001 | Boyer et al. | 725/40 |
| 6,285,407 B1 | 9/2001 | Yasuki et al. | |
| 6,285,685 B1 | 9/2001 | Bum | |
| 6,305,018 B1 | 10/2001 | Usui et al. | |
| 6,317,884 B1 | 11/2001 | Eames et al. | |
| 6,348,932 B1 * | 2/2002 | Nishikawa et al. | 715/719 |
| 6,430,233 B1 | 8/2002 | Dillon et al. | |
| 6,459,427 B1 * | 10/2002 | Mao et al. | 725/109 |
| 6,486,925 B1 | 11/2002 | Ko | |
| 6,502,243 B1 * | 12/2002 | Thomas | 725/110 |
| 6,510,557 B1 * | 1/2003 | Thrift | 725/110 |
| 6,526,576 B1 | 2/2003 | Kwoh | |
| 6,545,722 B1 | 4/2003 | Schulthesis et al. | |
| 6,567,981 B1 | 5/2003 | Jeffrey | |
| 6,622,304 B1 | 9/2003 | Carhart | |
| 2002/0035726 A1 * | 3/2002 | Corl | 725/39 |

FOREIGN PATENT DOCUMENTS

| | | |
|---|---|---|
| GB | 2323489 | 9/1998 |
| JP | 11-504171 | 4/1999 |
| WO | WO97/28499 | 8/1997 |
| WO | WO97/35432 | 9/1997 |
| WO | WO97/49237 | 12/1997 |
| WO | WO98/47287 | 10/1998 |
| WO | WO98/56172 | 12/1998 |
| WO | WO99/35843 | 7/1999 |

OTHER PUBLICATIONS

Thomson Consumer Electronics, Inc., ProScan DSS Receiver User's Manual, 1996, p. 61.

* cited by examiner

DBS FEATURE EXTENSION ARCHITECTURE

This application is a divisional of U.S. application Ser. No. 09/981,000, filed Dec. 3, 2001, now abandoned herein incorporated by reference.

BACKGROUND OF THE INVENTION

1. Field of the Invention

The present invention relates to the field of signal processing and, more particularly to integrated direct broadcast satellite systems, NTSC signal reception and display systems, and internet set top boxes.

2. Description of the Related Art

Today, there are many choices and/or sources of audio/video programming available to consumers for display on a television. These various sources of programming can bring many channels of entertainment and information into the home such as movies, sitcoms, news, sporting events, pay-per-view events, and the like. Such sources of programming range from over-the-air or off-air television signals receivable on an antenna, to direct broadcast satellite, to the internet.

However, at present, each programming source requires a different system or receiver to decode and process the incoming audio/video signals. In the case of a direct broadcast satellite (DBS) system wherein a digital data stream is transmitted from a satellite to a receiving dish, a DBS receiver is required to decode and process the incoming digital data stream. In the case of internet viewing, a separate computer system is required to receive and process the pages or content of the internet. Set-top internet receivers/boxes now integrate NTSC television processing capabilities receivable from several sources such as antennas and what is known as cable TV from a cable system.

Also, program guide or channel guide features are provided by each program source, such as DBS systems and off-air (NTSC) broadcasting. Program or channel guide information is transmitted in the digital data stream in the case of a DBS system, while such program information is transmitted as part of the VBI (Vertical Blanking Interval) of an analog NTSC television signal. More specifically, in the case of the digital data stream of a DBS, program guide information is transmitted along with the digital video signals as part of the PSI (program specific information) table within a standard encoded transport stream, such as MPEG-2. Additionally, each system requires separate control, tuning, and program guide compiling for viewing.

What is needed is an integrated system for DBS, internet, and NTSC television programming.

SUMMARY OF THE INVENTION

The present invention is directed towards an integrated DBS and internet receiver system wherein a single program guide encompassing DBS program channels and network program channels are compiled.

According to another aspect of the present invention, a DBS system is controllable through a linked internet receiver wherein seamless tuning of all program channels is accomplished through the internet receiver. As well, any broad-band data, including user selectable internet links received through DBS channels, may be used to retrieve and view internet data.

In one form, in a DBS/internet receiver system, the DBS system having a DBS receiver adapted to receive DBS program information including program guide information, the internet receiver having an internet receiver adapted to receive network program information and data including program guide information and internet data, there is provided a method for forming a combined DBS/network program guide. The method includes, providing the DBS receiver with a wide-band data/communications input/output port, providing the network receiver with a wide-band data/communications input/output port, linking the wide-band data/communications input/output port of the DBS receiver with the wide-band data/communications input/output port of the internet receiver, providing the internet receiver with the program guide information received by the DBS receiver through the wide-band data/communications ports, and integrating the DBS program guide information with the network program guide information on the internet receiver to obtain a combined DBS/network program guide for viewing on a display device.

An advantage of the present invention is the ability to have an enhanced or super program guide that combines the program guide of a DBS system with the program guide of an NTSC system.

Another advantage of the present invention is the ability to remotely control a DBS receiver with an internet/NTSC signal receiver.

A further advantage of the present invention is the ability to have enhanced DBS digital broadcasting using supplemental information carried by the DBS digital data stream.

BRIEF DESCRIPTION OF THE DRAWINGS

The above-mentioned other features and advantages of this invention, and the manner of attaining them, will become more apparent and the invention will be better understood by reference to the following description of an embodiment of the invention taken in conjunction with the accompanying drawings wherein.

The exemplification set out herein illustrates a preferred embodiment of the invention, in one form, and such exemplification is not to be construed as limiting the scope of the invention in any manner.

DETAILED DESCRIPTION OF THE INVENTION

Figure 1:
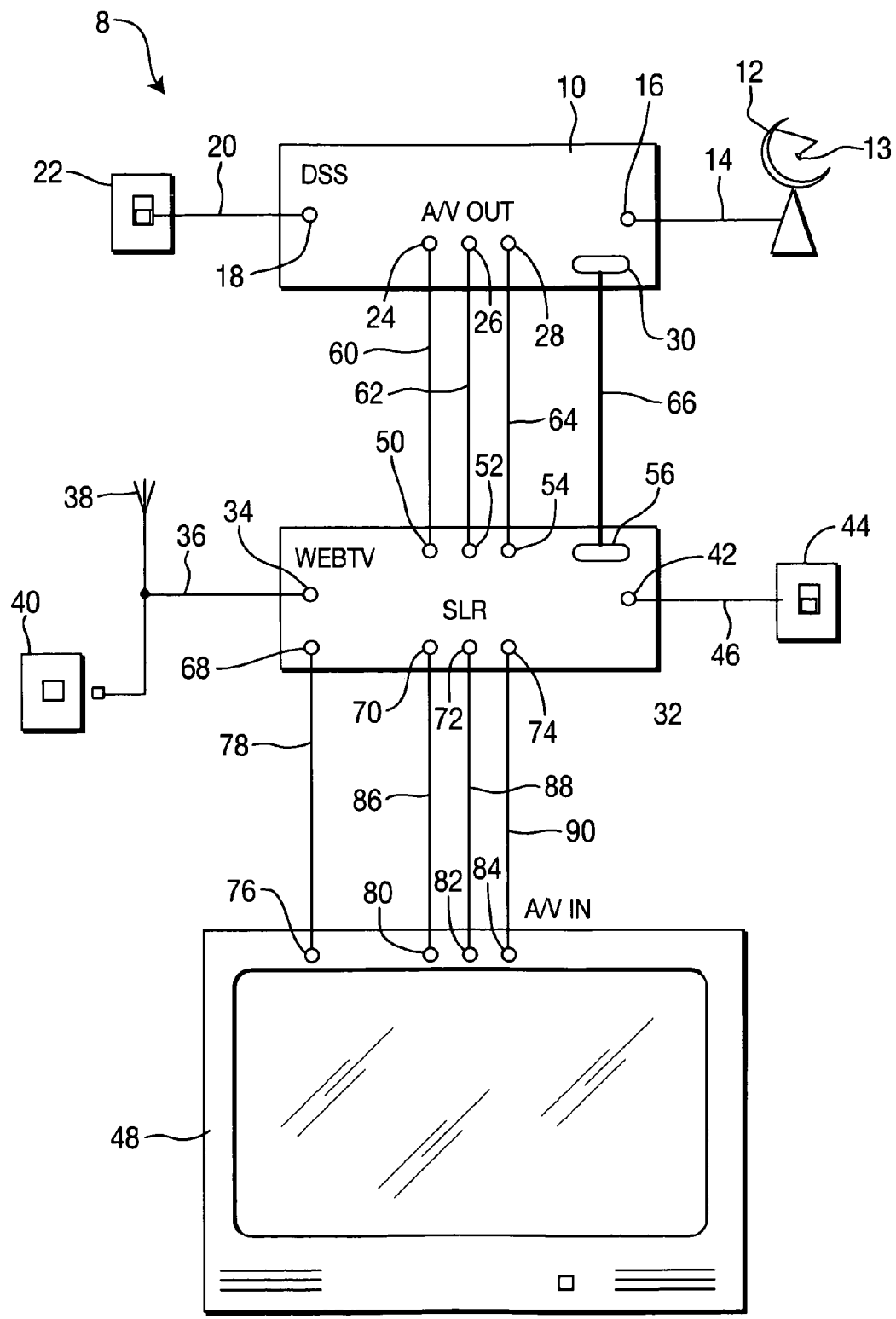
FIG. 1 is a diagrammatic view of a connection scheme between a DBS unit, an Internet receiver unit, and a display device in accordance with the present invention.

Referring now to the drawings and, more particularly FIG. 1, there is shown audio/video system 8 comprising direct broadcast satellite (DBS) unit 10, such as a DIRECTV® unit, internet unit 32, and display device 48 that are interconnected and function as described below.

DBS unit 10 receives signals from DBS dish or antenna 12 via cable 14 that plugs into input port 16. Input port 16 is coupled internally to appropriate circuitry as is known in the art in order to decode and/or process an incoming DBS data stream (an all digital data stream) typically transmitted from a satellite (not shown). DBS dish 12 includes feed horn 13 which receives the DBS data stream reflected by dish 12 as is known in the art. DBS unit 10 also includes telephone port 18 that is in communication with a telephone system via telephone line 20 connected to telephone jack 22 through which the DBS unit may communicate with a dial-up system. DBS unit 10 also includes a video output jack or port 24, a left audio output jack or port 26, and a right audio output jack or port 28 collectively marked "A/V OUT". Video output port 24 may be an S-video port or a composite video port. As well, but not shown, there may be a second video output port. In this case, the first video output port could be the S-video output port while the second video output port could be the composite video output port, or vice versa. The A/V OUT ports are coupled internally to appropriate circuitry as is known in the art. Additionally, in accordance with an aspect of the present invention, DBS unit 10 also includes high-speed or wide-band input/output port 30 that may utilize a DB15 type connector. Wide-band input/output port 30 is coupled internally to appropriate circuitry as is known in the art and is used to send and receive serial data for control information and for parallel digital output of data transmitted from the satellite. The wide-band data link between DBS unit 10 and internet unit 32 is used as a data bus. While not shown, it should be understood that DBS unit 10 also includes other typical features and/or components.

Internet receiver unit 32 is an integrated set-top box/internet receiver otherwise known as an NTSC receiving internet receiver with integrated software, such as a WebTV® "Plus" unit. Internet unit 32 is adapted to receive, process and/or decode internet data via telephone lines, cable lines, or other sources, as well as receive, process and/or decode television (NTSC audio/video) signals from a cable system, airwaves or other source. The television signals may include Extended Data Service (XDS) information such as closed captioning and V-chip (ratings) data for the various programs as well any other data or audio/video information. An NTSC audio/video signal is receivable from either antenna 38 or a cable system through cable jack 40 via cable 36 coupled to input port or jack 34. Input port 34 is coupled internally to appropriate circuitry that processes the incoming NTSC signal in a known manner for eventual displaying on display device 48. Internet unit 32 is coupled to a telephone phone system via telephone input/output port 42, telephone line 46 and telephone jack 44 which is then coupled in the usual manner with the telephone system. Internet unit 32 receives digital data from the Internet via the telephone system. Of course, other means of receiving Internet data may be used such as a cable TV system via an internal cable modem (not shown) or other source.

Additionally, internet unit 32 includes video input jack or port 50, left audio input jack or port 52, and right audio input jack or port 54, collectively marked "SLR" (S-video, Left, Right). The SLR inputs are coupled internally to appropriate circuitry as is known in the art. Video input port 50 may be an S-video input port or composite video input port that is coupled to video output port 24 of DBS unit 10 via communication line or cable 60 in order to receive the video output from DBS unit 10. As well, but not shown, there may be a second video input port. In this case, the first video input port could be the S-video output port while the second video output port could be the composite video output port, or vice versa. Internet unit 32 also has left audio input port or jack 52 that is in communication with left audio output port 26 of DSS unit 10 via line 62 in order to receive left channel audio from DSS unit 10, and right audio input port or jack 54 that is in communication with right audio output port 28 of DSS unit 10 via line 64 in order to receive right channel audio from DSS unit 10. In addition to the above input ports, internet unit 32 has high-speed or wide-band input/output data port 56 which is in communication with high-speed input/output data port 30 of DSS unit 10 via data/communication cable 66. Wide-band input/output data port 56 may utilize a DB-15 type connector. Such interface between DSS unit 10 and internet unit 32 provides a serial control bus between DSS unit 10 and internet unit 32 as well as a parallel digital output from DSS unit 10 to internet unit 32 for data transmitted from the satellite and received by DSS unit 10 through cable 14 (DSS data stream). High-speed input/output data port 56 is coupled internally to appropriate circuitry within internet unit 32 as is known in the art.

Internet unit 32 also includes video output port or jack 70, left audio output port or jack 72, right audio output port or jack 74, and RF output port or jack 68 all for providing various audio and video signals to display unit 48 and collectively labeled "SLR". Again, video output port 70 may be an S-video output port or a composite video output port. As well, but not shown, internet unit 32 may include a second video output port. In this case, the first video output port would support S-video, while the second video output port would support composite video, or vice versa.

Display unit 48, such as a television or monitor, is coupled to internet unit 32 in order to receive the various audio and video signals therefrom. Specifically, display unit 48 includes RF input port or jack 76 which is in communication with RF output port 68 of internet unit 32 via RF cable 78, such as coaxial cable. The RF connection between internet unit 32 and display device 48 allows the RF output from internet unit 32 to be received by display unit 48 on channel 3 or 4 via an RF modulator (not shown), providing an RF "pass-through" capability when internet unit 32 is in a standby mode. This functionality is similar to the functioning of a coupled VCR and television. Display unit 48 also includes video input port or jack 80, to receive S-video or composite video, which is in communication with video output port 70 of internet unit 32. While not shown, display device 48 may include a second video input. In the case of a second video input, one video input would be an S-video input while the other video input would be a composite video input. Further, display unit 48 includes left audio input port or jack 82 which is in communication with left audio output port 72 of internet unit 32 via line 88 in order to receive left channel audio, and right audio input port or jack 84 which is in communication with right audio output port 74 of internet unit 32 via line 90 in order to receive right channel audio. S-video, composite video and left and right audio outputs of internet unit 32 and inputs of display device 48 may be used to provide a higher quality audio/video experience than the RF feed. While not shown, it should be understood that display device 48 may also include various audio and video outputs for connection to other audio/video devices.

Figure 2:
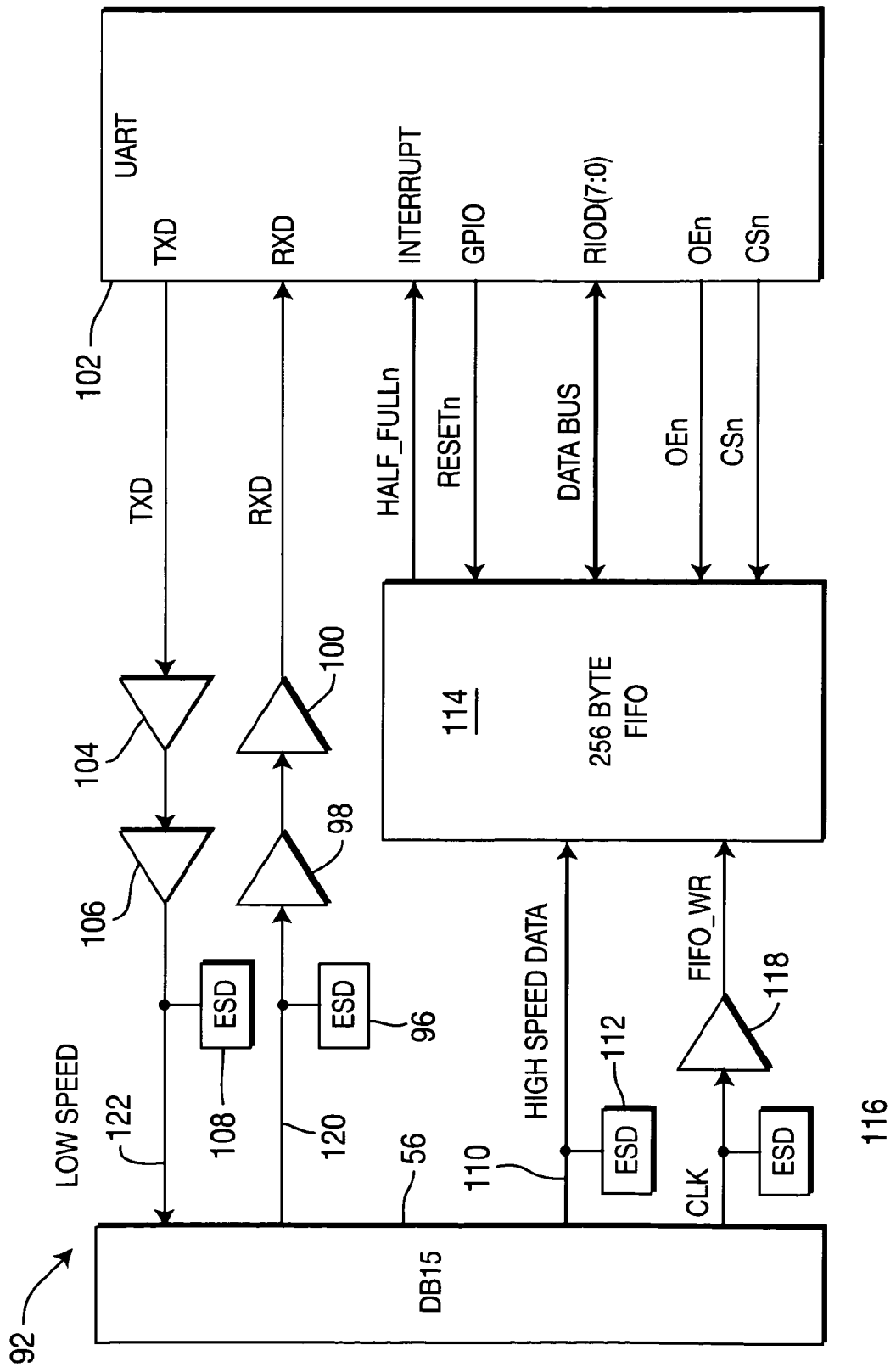
FIG. 2 is a block diagram of an interconnection scheme between the DBS unit and the Internet receiver unit of FIG. 1.

With reference now to FIG. 2, there is shown interconnect or interface diagram 92 for internet unit 32 that allows internet unit 32 to communicate with and/or receive data from DBS unit 10 over a wide-band data link. It should be understood that internet unit 32 may be any type of data processing box, wherein the data processing box accepts analog and digital data signals, such as NTSC television signals and MPEG-2 data over the internet. Wide-band port 56 (labeled as a DB15 connector) provides a communication interface for LOW SPEED data as well as HIGH SPEED data to and from DSS unit 10.

Low speed serial control data from DSS unit 10 is received into port 56 and is routed on line 120 into first inverter buffer 98 then second inverter buffer 100 before it is sent along RXD (receive data) line and into the RXD (receive data) serial data input of system interface IC 102. As shown, system interface IC 102 includes one UART (Universal Asynchronous Receive/Transmit). System interface IC may be a SOLO IC which is a graphics special ASIC (Application Specific Integrated Circuit) of a WebTV® type internet/set-top box unit and is in communication with the microprocessor (not shown) of internet unit 32. Other devices capable of receiving serial data may also be used. Inverter buffers 98 and 100 are preferably Schmitt Trigger buffers. ElectroStatic Discharge (ESD) circuitry 96 is provided before inverter buffer 98 for electrostatic protection. Low speed serial control data from internet unit 32 is sent from TXD (transmit data) output of UART 102 into first inverter buffer 104 and then into second inverter buffer 106. Second inverter buffer 106 is coupled via line 122 with wide-band port 56 such that the low speed serial control data is sent to DSS unit 10. ElectroStatic Discharge (ESD) circuitry 108 is preferably provided between inverter buffer 106 and wide-band port 56 for electrostatic protection. The low speed serial control functionality is provided with a full duplex serial capability operating at a maximum of 9600 baud, and provides a means of control between DBS unit 10 and internet unit 32.

The HIGH SPEED DATA path (labeled as such in FIG. 2) is an 8 bit wide data bus and includes ElectroStatic Discharge (ESD) protection circuit 112. High speed data is received from DSS unit 10 into FIFO (First In First Out) memory 114 via the HIGH SPEED DATA PATH while FIFO memory 114 is strobed or clocked with a clock signal from DBS unit 10 via CLK path from port 56. The clock signal is conditioned with a Schmitt Trigger inverter buffer 118 and also includes ElectroStatic Discharge (ESD) protection circuit 116. In operation, when FIFO memory 114 is half full, FIFO memory 114 provides an interrupt signal to system interface IC 102 via line HALF_FULLn (also the command label) that is coupled to INTERRUPT. The interrupt signal allows system interface IC 102 to receive 128 bytes of data (one half of FIFO memory 114's 256 byte capacity) via DATA BUS line and into RIOD (Receive IO Data). The data word length is 8 bits with one control bit, hence the nomenclature "7:0". As well, system interface IC 102 includes chip select outputs OEn and CSn that are received by FIFO memory 114 via lines OEn and CSn respectively. In this manner, internet unit 32 and DSS unit 10 can provide each other with control data and transmit and receive high and low speed data.

With the above connections described with respect to the various incoming digital (both the DBS data stream and the internet data stream) and NTSC signals, and the interconnections of DBS unit 10, internet unit 32, and display device 48, functionality in accordance with an aspect of the present invention will now be discussed.

With DBS unit 10 coupled to internet unit 32, internet unit 32 is capable of controlling DBS unit 10. In this manner, DBS unit 10 becomes a slave peripheral to internet unit 32. Channel tuning for both internet unit 32 and DBS unit 10 can be accomplished seamlessly through internet unit 32 only, such that both NTSC and DBS audio/video sources may be displayed on display device 48. As an example, a user may, via a remote control (not shown), select channel 13 (or any other "off air" channel which go to channel 69, or a cable channel) for viewing on display unit 48 through internet unit 32, and internet unit 32 would tune its own internal tuner to the correct channel as received by either antenna 38 or cable 40, and then provide that output to display device 48. If the user selects channel 206 on the remote, internet unit 32 would recognize channel 206 as a DBS channel (over and above the off-air and cable channels), and thus utilize the communication capability to cause DBS unit 10 to tune to channel 206 and provide the audio/video output to internet unit 32 that would in turn provide the audio/video output to display device 48. Utilizing various commands, internet unit 32 can query DBS unit 10 and cause it to turn on an tune to a particular channel. Because of the interconnectivity between DBS unit 10 and internet unit 32 as described above, there is no need for IR "blaster" cabling and/or configuration routines.

Another capability of system 8 due to its interconnectivity is the ability to provide Electronic Program Guide (EPG) integration of the DBS EPG from DBS unit 10 and the NTSC EPG from internet unit 32. Electronic Program Guide (EPG) information is part of the DBS digital data stream received by dish 12 and is for the various DBS channels receivable by DBS unit 10. EPG information for the various NTSC channels is also receivable in the VBI (Vertical Blanking Interval) of certain NTSC signals. Internet unit may request this information from DBS unit 10 and seamless integrate the DBS EPG information with the NTSC EPG information. Channel selection is then accomplished through internet unit 32 as described above. DBS information may also be contained in the NTSC VBI of a channel, or through a dial-up database via telephone line 46.

DBS bandwidth may also be used to provide other information services such as news summaries, sports scores, stock quotes, and the like. This information may be overlaid on any DBS or NTSC program by internet unit 32.

Additionally, DBS bandwidth (data stream) may be used as a replacement to dial-up internet access by providing a series of web (internet) pages thus freeing up the telephone line. A DBS "Web channel" either as a separate broadcast DBS channel or through the DBS EPG would be selectable by the user. Instead of the Web channel containing a video and/or audio transport, the Web channel would contain only a data transport which would be relayed directly to internet unit 32. The user would then have the option of viewing a received web page or store it in a cache for later viewing. The Web channel would utilize the DBS bandwidth by delivering such data on a single transponder. Large quantities of data may be transmitted on a single transponder making efficient use of available bandwidth or smaller quantities of data may be transmitted on all transponders for constant availability.

Further, in accordance with an aspect of the present invention, wide-band data may be integrated with the DBS data stream as data payload. The wide-band data payload would be associated with at least one and preferably each DBS program and could include internet or internet type/linked data. When a DBS program is selected and viewed, the wide-band data payload that is received by DBS unit 10, is transmitted out of wide-band data port 30 of DBS unit 10 into wide band data port 56 for receipt by internet unit 32. Internet data is thus transmitted from the satellite, received on current DBS systems, and processed by the internet receiver. This allows the wide-band data payload content to be overlayed with the satellite's video signal, as well as other video manipulations. In one form, by providing the wide-band data as a multicast internet protocol (such as Intercast or ATVEF), internet unit 32 would interpret this information/data and use it in conjunction with the received audio/video signal. It should be understood that the ATVEF specification includes HTML extensions to size/scale a video window, position same on the screen, and overly supplemental text and graphics (also formatted in HTML) around or over the video signal. The DBS data stream can thus deliver supplemental interactive data, including internet data, as another transport for a given program (in addition to the audio, video, and closed-captioning transports that may already be available). Any interactive internet content is deliverable over and receivable by existing DBS systems. Since the DBS system is coupled to the internet receiver by the wide-band data link, the functionality of DBS system is expanded to include interactive content delivered by the broadcasting satellite without modification to the existing DBS unit.

DBS unit 10 and internet unit 32 may also be combined into one unit able to receive a DBS data stream, an NTSC data stream, and be coupled to the various I/O devices/lines as described above. As well, display device 48 may incorporate all of the above. Such a combined unit (containing all the features and functions of internet unit 32 and DBS unit 10) could utilize the same data stream and deliver the same functionality.

The DBS data stream can also carry programs that may be executable on Internet unit 32. As an example, a binary image may be sent such as an operating system (OS) or application. The code is resident on internet unit 32 or "native", meaning a binary image compiled to run on the hardware of internet unit 32. Additionally, Java applications may be sent in the DBS data stream and executed on internet unit 32, with internet unit 32 having a Java Virtual Machine (JVM). Java programs run on any hardware platform because they are interpreted by the JVM, rather than compiled for a specific hardware architecture.

As well, URLs (Universal Resource Locators) may be received using Extended Data Services (XDS) as part of the EIA-746 specification which then may be used by the browser of internet unit 32 to display the web site according to the URL by delivering the URL through the DBS data stream or through a dial-up connection. Since DBS transmits closed captioning and XDS through a second data stream (there is no VBI or Vertical Blanking Interval in the digital domain) the URLs are processed directly, rather than waiting for the DBS box to re-encode them back into the VBI of the video output.

While this invention has been described as having a preferred design, the present invention can be further modified within the spirit and scope of this disclosure. This application is therefore intended to cover any variations, uses, or adaptations of the invention using its general principles. For example, the wide-band data link may be replaced with any data port having the capability of transmitting the defined information. Further, this invention may be utilized with any digital set-top box, such as a digital cable box or MMDS, which provides for the simultaneous delivery of data. Further, this application is intended to cover such departures from the present disclosure as come within known or customary practice in the art to which this invention pertains and which fall within the limits of the appended claims.

What is claimed is:

1. In a stand-alone digital video receiver coupled to a stand-alone internet receiver, a method of delivering data to a display device comprising steps of:
   receiving a digital data stream including internet content data and digital program guide information from a first signal source, wherein the internet content data is received as a digital data transport stream in a separate broadcast channel that is selectable by a user and that is dedicated to providing the internet content data without ever providing a digital video transport stream or a digital audio transport stream;
   providing a single bi-directional data link operative to transmit data between the stand-alone digital receiver and the stand-alone internet receiver in accordance with at least two different transmission speeds;
   transmitting the internet content data and the digital program guide information to the stand-alone internet receiver through the single bi-directional data link in accordance with a first data transmission speed, wherein the stand-alone internet receiver processes the internet content data received through the single bi-directional data link to generate processed internet content data;
   transmitting a first control signal to the stand-alone internet receiver through the single bi-directional data link in accordance with a second data transmission speed different from the first data transmission speed, wherein the stand-alone internet receiver transmits a second control signal to the stand-alone digital video receiver through the single bi-directional data link in accordance with the second data transmission speed;
   wherein the stand-alone internet receiver receives analog program guide information from a second signal source and integrates the analog program guide information with the digital program guide information to generate a combined program guide; and
   wherein the stand-alone internet receiver provides the processed internet content data and data representative of the combined program guide to the display device.

2. The method of claim 1, wherein the second control signal includes a channel selection signal that causes the stand-alone digital video receiver to tune a selected channel.

3. The method of claim 1, wherein the stand-alone digital video receiver comprises a satellite receiver and the separate broadcast channel containing the internet content data is provided via a single transponder dedicated to providing the internet content data without providing a digital video transport stream or a digital audio transport stream.

4. The method of claim 1, wherein the stand-alone internet receiver receives the analog program guide information via a vertical blanking interval of an analog signal.

5. The method of claim 1, wherein the stand-alone internet receiver:
   receives a channel selection command indicating a selected channel;
   determines if the selected channel is provided by the first signal source or the second signal source;
   transmits a channel selection signal to the stand-alone digital video receiver through the single bi-directional data link in accordance with the second data transmission speed in response to determining that the selected channel is provided by the first signal source; and
   tunes an internal tuner to the second signal source in response to determining that the selected channel is provided by the second signal source.

6. The method of claim 5, wherein the stand-alone internet receiver:
   receives digital video signals representing the selected channel from the stand-alone digital video receiver through the bi-directional data link in accordance with the first data transmission speed if the selected channel is provided by the first signal source;
   receives analog video signals representing the selected channel from the second signal source if the selected channel is provided by the second signal source; and
   provides one of the received digital video signals and the received analog video signals to the display device.

7. A method for enabling a visual display using an internet receiver coupled to a digital video receiver, the method comprising steps of:
   receiving first program guide information from a first signal source via the internet receiver;
   providing a single bi-directional data link operative to transmit data between the internet receiver and the digital video receiver in accordance with at least two different transmission speeds;
   receiving second program guide information and internet content data from a second signal source via the digital video receiver, wherein the internet content data is received as a digital data transport stream in a separate broadcast channel that is selectable by a user and that is dedicated to providing the internet content data without ever providing a digital video transport stream or a digital audio transport stream;

transmitting the second program guide information and the internet content data from the digital video receiver to the internet receiver via the single bi-directional data link in accordance with a first data transmission speed;

transmitting a first control signal from the digital video receiver to the internet receiver via the single bi-directional data link in accordance with a second data transmission speed different from the first data transmission speed;

transmitting a second control signal from the internet receiver to the digital video receiver via the single bi-directional data link in accordance with the second data transmission speed;

integrating the first program guide information with the second program guide information to form a combined program guide via the internet receiver;

processing the internet content data via the internet receiver to generate processed internet content data; and providing the processed internet content data and data representative of the combined program guide from the internet receiver to a display device which enables the visual display.

8. The method of claim 7, wherein the internet receiver and the digital video receiver are both stand-alone devices.

9. The method of claim 7, wherein the digital video receiver comprises a satellite receiver and the separate broadcast channel containing the internet content data is provided via a single transponder dedicated to providing the internet content data without providing a digital video transport stream or a digital audio transport stream.

10. The method of claim 7, wherein the internet receiver receives the first program guide information via a vertical blanking interval of an analog signal and the digital video receiver receives the second program guide information via a digital data stream.

11. The method of claim 1, wherein the first data transmission speed is faster than the second data transmission speed.

12. The method of claim 1, wherein the stand-alone digital video receiver comprises a satellite receiver and the separate broadcast channel containing the internet content data is provided via a plurality of transponders.

13. The method of claim 7, wherein the first data transmission speed is faster than the second data transmission speed.

14. The method of claim 7, wherein the digital video receiver comprises a satellite receiver and the separate broadcast channel containing the internet content data is provided via a plurality of transponders.

15. The method of claim 7, further comprising steps of:
receiving, via the internet receiver, a channel selection command indicating a selected channel;
determining, via the internet receiver, if the selected channel is provided by the first signal source or the second signal source;
transmitting, via the internet receiver, a channel selection signal to the digital video receiver through the single bi-directional data link in accordance with the second data transmission speed in response to determining that the selected channel is provided by the first signal source; and
tuning, via the internet receiver, an internal tuner to the second signal source in response to determining that the selected channel is provided by the second signal source.

16. The method of claim 15, further comprising steps of:
receiving, via the internet receiver, digital video signals representing the selected channel from the digital video receiver through the bi-directional data link in accordance with the first data transmission speed if the selected channel is provided by the first signal source;
receiving, via the internet receiver, analog video signals representing the selected channel from the second signal source if the selected channel is provided by the second signal source; and
providing, via the internet receiver, one of the received digital video signals and the received analog video signals to the display device to enable the visual display.

* * * * *